(12) United States Patent
Tsyganok (10) Patent No.: US 9,600,355 B2
(45) Date of Patent: *Mar. 21, 2017

(54) REDUNDANT ENCODING

(71) Applicant: Talkatone, LLC, Palo Alto, CA (US)

(72) Inventor: Vadim Tsyganok, Moraga, CA (US)

(73) Assignee: Talkatone, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,418

(22) Filed: Jan. 20, 2016

(65) Prior Publication Data
US 2016/0139972 A1    May 19, 2016

Related U.S. Application Data

(63) Continuation of application No. 14/105,014, filed on Dec. 12, 2013, now Pat. No. 9,280,413.

(51) Int. Cl.
*G06F 11/00* (2006.01)
*G06F 11/07* (2006.01)
*H04L 12/26* (2006.01)
*H04L 1/00* (2006.01)
*G06F 11/08* (2006.01)
*H04L 1/08* (2006.01)

(52) U.S. Cl.
CPC ........ *G06F 11/076* (2013.01); *G06F 11/0721* (2013.01); *G06F 11/08* (2013.01); *H04L 1/0009* (2013.01); *H04L 43/0823* (2013.01); *H04L 1/08* (2013.01)

(58) Field of Classification Search
CPC ...................................................... G06F 11/08
See application file for complete search history.

(56) References Cited

U.S. PATENT DOCUMENTS

2008/0184081 A1*  7/2008  Hama ............... H04L 1/0026
                                                         714/708

* cited by examiner

Primary Examiner — Sam Rizk
(74) Attorney, Agent, or Firm — Van Pelt, Yi & James LLP (57) ABSTRACT

Analyzing data is disclosed. Error events are tracked. The error events are classified based on a number of errors included in each event. A desired level of error event to be able to be corrected in order to maintain an acceptable rate of uncorrected errors is determined. A redundancy level is selected so that new error events corresponding to the desired level of error event or a lower level of error event are corrected.

20 Claims, 5 Drawing Sheets

REDUNDANT ENCODING

CROSS REFERENCE TO OTHER APPLICATIONS

This application is a continuation of co-pending U.S. patent application Ser. No. 14/105,014, entitled REDUNDANT ENCODING filed Dec. 12, 2013 which is incorporated herein by reference for all purposes.

BACKGROUND OF THE INVENTION

Voice communication and other time sensitive data may be transmitted over unreliable networks such as IP networks, cellular network, wireless network, and the Internet. Data packets may be lost while being sent through the network. Often communication redundancy is required to compensate for the lost packets. For example, network packets with redundant data may be sent more than once in case one of the network packets is dropped. However, it is often difficult to determine an optimum level of redundancy. Additionally, additional communication redundancy requires additional bandwidth and communication delay requirements that may be undesirable. Therefore, there exists a need for a way to more efficiently provide communication redundancy.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Analyzing data is disclosed. In some embodiments, error events are tracked over an interval of time. The error events are classified based on a number of errors included in each event. For example, network packet loss is tracked by a receiver and for each group of one or more consecutive packet losses, the number of packet losses in the group is tracked. A desired level of error event to correct in order to maintain an acceptable rate of uncorrected errors is determined. For example, the number of consecutive packet losses to be able to be corrected to achieve a desired correction rate is determined. A redundancy level is determined so that error events corresponding to the desired level of error event or a lower level of error event are corrected. For example, a real-time streamed audio is desired to be reliably transmitted and each audio data frame of the streamed audio is duplicated a number of times based on the number of consecutive packet losses to be able to be corrected in real-time and the duplicated audio frames are sent in different network data packets.

Figure 1:
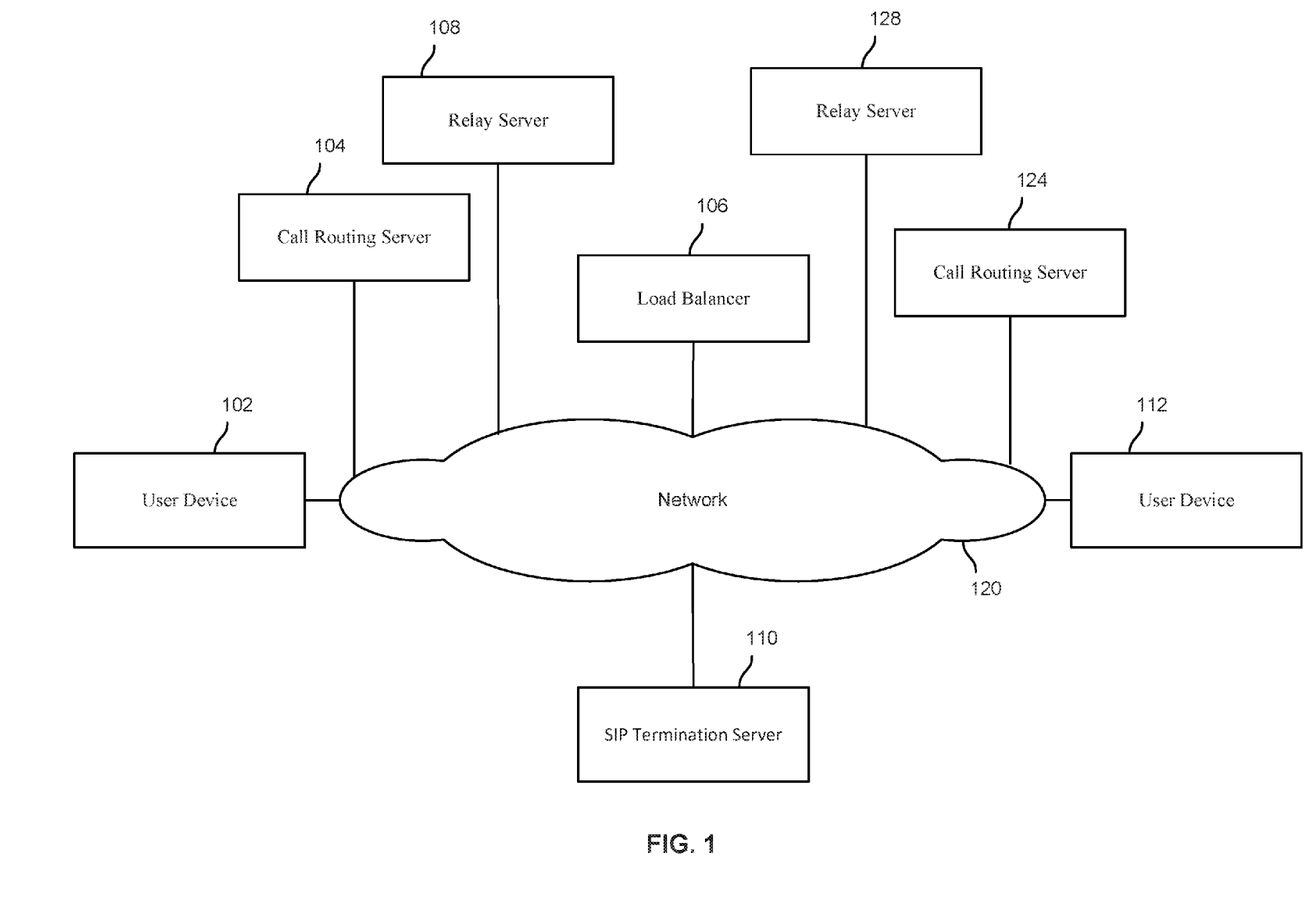
FIG. 1 is a block diagram illustrating an embodiment of a data transmission environment.

FIG. 1 is a block diagram illustrating an embodiment of a data transmission environment. For example, FIG. 1 illustrates a Voice over Internet Protocol (VOIP) environment. User device 102 desires to send data to user device 112. For example, user device 102 desires to make an audio call with user device 112. Examples of user device 102 and user device 112 include a mobile device, a smart phone, a tablet computer, a wearable computer, a watch, a vehicle computer, an optical head-mounted display device, a desktop computer, a laptop computer, a telephone, an IP phone, a video conferencing device, a conference telephone, and any other communication or computing device.

User device 102 contacts call routing server 104 via network 120 to indicate a desire to establish communication (e.g., live real-time communication such as a VOIP phone call and video call). For example, an identifier of a desired communication party is provided to call routing server 104. Call routing server 104 determines how to establish the desired communication. Call routing server 104 contacts load balancer 106 to allocate an audio relay server for the communication and load balancer 106 selects the optimal server for the communication. In some embodiments, load balancer 106 selects an audio relay server based at least in part on one or more of the following: a geographical proximity to a device initiating the communication, a geographical proximity to a user device receiving the communication, network topology, network capacity, an available capacity of an audio relay server, and a connection speed to an audio relay server. For example, the geographically closest audio relay server with available capacity is selected. In some embodiments, a plurality of audio relay servers is connected to network 120. In the example of FIG. 1, relay server 108 has been selected as the relay server to be utilized by user device 102.

In the event the desired communication of device 102 is a communication with a Plain Old Telephone Service (POTS) device (e.g., device addressable with a POTS number) and/or communication via a public switched telephone network (PSTN), call routing server 104 signals to SIP Termination Server 110, using Session Initiation Protocol (SIP), the desired communication to be established. SIP Termination Server 110 attempts to establish the communication session with the desired communication party. For example, SIP Termination Server 110 provides communication services to user device 112 and enables user device 112 to send and receive data to user device 102 via SIP Termination Server 110 and audio relay server 108.

In the event the desired communication of device 102 is a communication with another user device that is reachable directly via one or more audio relay servers (e.g., audio relay servers of a single entity providing the communication service to device 102), call routing server 104 attempts to contact a call routing server of the communication recipient (e.g., call routing server 124 assigned to communication recipient user device 112). Call routing server 124 contacts load balancer 106 to allocate an audio relay server for the communication and load balancer 106 selects the optimal server for the user device 112. In some embodiments, load balancer 106 selects an audio relay server based at least in part on one or more of the following: a geographical proximity to a device initiating the communication, a geographical proximity to a user device receiving the communication, network topology, network capacity, an available capacity of an audio relay server, and a connection speed to an audio relay server. For example, the geographically closest audio relay server to user device 112 with available capacity is selected. In some embodiments, a plurality of audio relay servers is connected to network 120. In the example of FIG. 1, relay server 128 has been selected as the relay server to be utilized by user device 112.

The selected relay server 108 relays communication between user device 102 and user device 112 via network 120 and either SIP Termination Server 110 or audio relay server 128. For example, audio communication from user device 102 is sent to audio relay server 108 and audio relay server 108 sends the audio communication to SIP Termination Server 110 or another server instructed by SIP Termination Server 110 to handle the communication for a user of SIP Termination Server 110. In another example, audio communication from user device 102 is sent to audio relay server 108 and audio relay server 108 sends the audio communication to audio relay server 128 to allow audio relay server 128 to send the audio communication to user device 112 via network 120. In some embodiments, a single audio relay server handles communication between user device 102 and user device 112 via network 120. User device 112 may provide data to user device 102 via the same servers and/or channels utilized by user device 102 to provide data to user device 112. For example, communication data from user device 112 is provided to user device 102 via SIP Termination Server 110 and relay server 108. In another example, communication data from user device 112 is provided to user device 102 via relay server 128 and relay server 108.

Communication between devices via network 120 may not be reliable. For example, communication may be sent in packets and the packet may become corrupted and/or lost. In some embodiments, data communication redundancy is desired between user device 102 and audio relay server 108, between audio relay server 108 and audio relay server 128, between an audio relay server and SIP Termination Server 110 or another server instructed by SIP Termination Server 110 to handle the communication for a user of SIP Termination Server 110, and/or between user device 112 and audio relay server 128. For example, real-time communication such as audio or video streaming/communication data is desired to be sent redundantly between devices to guarantee a communication quality level.

One or more of the following may be included in network 120: a direct or indirect physical communication connection, mobile communication network, Internet, intranet, Local Area Network, Wide Area Network, Storage Area Network, a wireless network, a cellular network, PTSN, and any other form of connecting two or more systems, communication devices, components, or storage devices together. Although example instances of components have been shown to simplify the diagram, additional instances of any of the components shown in FIG. 1 may exist. Any of the components shown in FIG. 1 may be physically integrated in a single hardware component or may represent a plurality of hardware components. In some embodiments, one or more of the components shown in FIG. 1 may be directly connected to each other rather than being connected via network 120. Components not shown in FIG. 1 may also exist.

Figure 2:
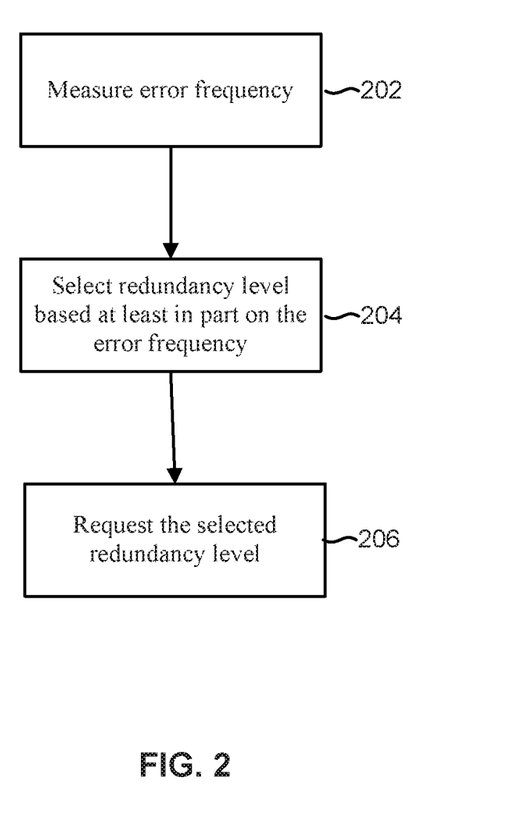
FIG. 2 is a flowchart illustrating an embodiment of a process for selecting a redundancy level.

FIG. 2 is a flowchart illustrating an embodiment of a process for selecting a redundancy level. At least a portion of the process of FIG. 2 may be implemented on user device 102, relay server 128, relay server 108, and/or user device 112. For example the process of FIG. 2 is used by a receiver of data to select and request a redundancy level based on an observed error rate. The process of FIG. 2 may be performed periodically and/or dynamically to update a desired redundancy level.

At 202, error frequency is measured. In some embodiments, the measured error frequency includes network error frequency. Traditionally communication error has been measured as a total packet loss percentage. For example, total number of packets lost during a time interval has been traditionally measured and reported as a measure of network quality. However, for certain types of data, simply measuring the total number of packets lost may not sufficiently capture a desired quality attribute of the network. For example, a simple total 10% packet loss statistic is unable to distinguish between one network packet being lost for every tenth packet or ten packets being lost in a row for every 100 packets. For certain types of data such as voice, video, streaming data, and/or live/real-time data, it may be important that long periods of consecutive errors do not occur. For example, a recipient of a voice phone call may be able to understand a voice audio stream that is missing one of every ten voice audio packets, but a consecutive loss of ten packets may result in an entire loss of a word included in the voice audio stream.

In some embodiments, the error events are classified based on a number of errors included in each event. In some embodiments, measuring the error frequency includes tracking the number of consecutive data segments that have become lost or corrupted during data transmission through a network. For example, the number of consecutive network data packets that have become lost or corrupted is measured. Each network data packet may include one or more segments of data such as frames of an audio data. In some embodiments, error events are tracked over an interval of time. The interval of time may be a dynamically determined and/or predetermined periodic amount of time. In some embodiments, each error event may be associated with one or more sequentially consecutive network packets. For example, a group of consecutive network packets that have become lost or corrupted is classified as a single error event. In some embodiments, measuring the error frequency includes tracking the number of packets included in each error event. For example, a table or other data structure is used to tally, for each group of one or more sequentially consecutive error network packets, the number of packets included in the group. This may allow one to determine how many consecutive network packets are likely affected when a network transmission error event occurs.

At 204, a redundancy level based at least in part on the error frequency is selected. In some embodiments, selecting the redundancy level includes determining a desired level of error event to be able to be corrected in order to maintain an acceptable rate of uncorrected errors. For example, the number of consecutive errors (e.g., consecutive packet loss/corruptions) to be able to be corrected to achieve a desired correction rate is determined. A redundancy level is determined so that error events corresponding to the desired level of error event or a lower level of error event are corrected. For example, a VOIP call is desired to be reliably transmitted and each audio data frame of the streamed audio is duplicated a number of times based on the number of consecutive packet losses to be able to be corrected and the duplicated audio frames are sent in different data packets.

In some embodiments, a distribution of the number of errors (e.g., number of packets) included in error events measured in 202 is utilized to select a number such that the number of error events with number of errors greater than the selected number is less than or equal to a threshold value. For example, for a distribution of number of errors (e.g., two error events with only one consecutive error packet, seven error events with two consecutive error packets and three error events with three consecutive error packets), "2" is selected as the number of errors to be able to be corrected such that the number of error events with number of error events greater than the selected number (e.g., three error events with errors greater than two) is less than or equal to a threshold value (e.g., threshold value of three).

In some embodiments, a distribution of the number of errors (e.g., number of packets) included in error events measured in 202 is utilized to select a number such that the percentage of error events with number of errors greater than the selected number is less than or equal to a threshold percentage. For example, for a distribution of number of errors (e.g., two error events with only one consecutive error packet, seven error events with two consecutive error packets and three error events with three consecutive error packets), "2" is selected as the number of errors to be corrected such that the percentage of error events with number of errors greater than the selected number (e.g., 30% error events with errors greater than two) is less than or equal to a threshold percentage (e.g., threshold 30%).

In some embodiments, selecting the redundancy level includes utilizing a plurality of measured error frequencies. For example, for each of a plurality of measured error frequencies over different time intervals (e.g., the time intervals may or may not overlap) a value is determined and the determined values are weighted and/or averaged to determine a single value utilized at least in part to select the redundancy level. In some embodiments, selecting the redundancy level includes utilizing a total error rate over a time interval. For example, total number of packet loss over a time interval and a statistical distribution of the number of consecutive error packets included in each error event over the same time interval are utilized to select the redundancy level.

In some embodiments, selecting the redundancy level includes determining a number of duplicate copies of the same data desired to be transmitted by a sender. For example, a number of duplicate audio frames of an audio communication desired to be transmitted by a transmitter is determined (e.g., number of duplicate audio frames to be transmitted by relay server 108 to user device 102 of FIG. 1 when relay server 108 is sending audio data to user device 102). For example, if "2" is selected as the number of consecutive network packet errors to be able to be corrected, two additional (e.g., three total) packets with duplicate data are desired to be sent by the transmitter by selecting a redundancy level of three, allowing one packet to be received even if two of the duplicate packets are lost. In some embodiments, selecting the redundancy level includes determining a number of different data segments to be included in network data packets to be provided. For example, a number of audio frames that is desired to be included in each received network packet is determined and the audio frames may be duplicated across audio frame slots of different network packets.

At 206, the selected redundancy level is requested. In some embodiments, the selected redundancy level was selected by a receiver of a communication and the receiver of the communication indicates to the sender of the communication the selected redundancy level desired to be modified in real-time. For example, when user device 102 is receiving communication, user device 102 selects a desired redundancy level and indicates it to relay server 108 and when relay server 108 is receiving communication, relay server 108 selects a desired redundancy level and indicates it to user device 102 of FIG. 1. The selected redundancy level may be also communicated between relay server 108 and relay server 128 and/or between relay server 128 and user device 112 of FIG. 1.

In various embodiments, bidirectional communication between two communication parties requires each communication party to select and request a redundancy level from the other communication party. The selected redundancy level of each communication party may not need to be the same. For example, sending and receiving bandwidth and network conditions may be different and may require different redundancy levels for the different communication direction channels between the communication parties.

In some embodiments, the requested redundancy level does not have to be honored by a sender of the communication that received the request. For example, the requested redundancy level may not be possible and/or not optimal as determined by the sender of the communication. In some embodiments, the selected redundancy level is not requested if the selected redundancy level is the same as the current redundancy level.

In some embodiments, the selected redundancy level is indicated via in-band signaling. For example, the receiver of a communication sends the request for the selected redundancy level via the same communication channel utilized to receive the communication to be adjusted. The in-band signaling may be achieved using information included in a packet header (e.g., additional header in RTP packet headers) and/or mixed into an audio stream (e.g., Session Traversal Utilities for NAT (STUN) messages mixed along with audio data frames).

In some embodiments, the selected redundancy level is indicated via out-of-band signaling. For example, receiver of the communication sends the request for the selected redundancy level via a communication channel different from the communication channel utilized to receive the communication to be adjusted. The out-of-band signaling may be achieved using SIP (e.g., using "SIP INFO," etc.) and/or Extensible Messaging and Presence Protocol (XMPP) (e.g., using IQ stanzas, etc.). For example, the selected redundancy level is communicated between user device 102 and relay server 108 via call routing server 104 of FIG. 1. In some embodiments, the selected redundancy level is indicated via a dedicated communication channel (e.g., utilizing RTP Control Protocol (RTCP), etc.).

Figure 3:
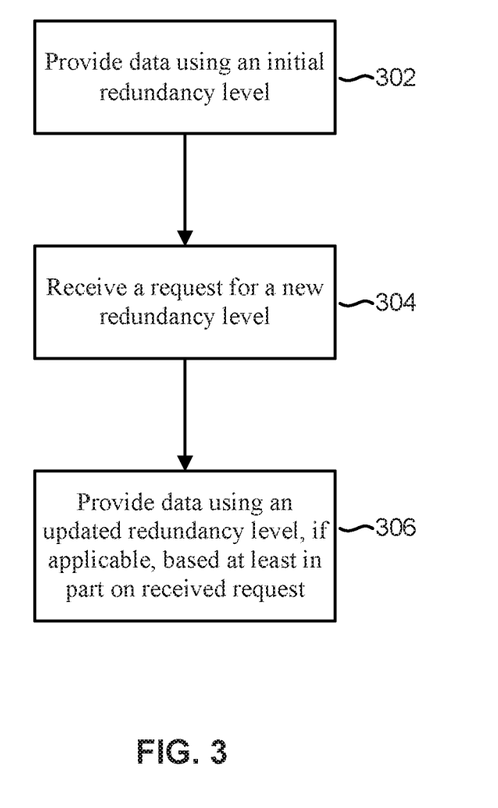
FIG. 3 is a flowchart illustrating an embodiment of a process for providing data.

FIG. 3 is a flowchart illustrating an embodiment of a process for providing data. At least a portion of the process of FIG. 3 may be implemented on user device 102, relay server 108, relay server 128, and/or user device 112. For example, the process of FIG. 3 is used by a sender of data to provide data using a requested redundancy level requested at 206 of FIG. 2.

At 302, data is provided using an initial redundancy level. In some embodiments, the initial redundancy level is a predetermined redundancy level. For example, a default initial redundancy level is utilized. In some embodiments, the initial redundancy level is selected based on a network connection parameter. For example, the initial redundancy is selected based on a type of network connection (e.g., WIFI, wired connection, or mobile network connection, etc.) utilized by a receiver and/or a sender of the data. Other examples of the network connection parameter include a type of wireless network standard being utilized (e.g., 802.11 A, B, G, N, etc.), speed of a network, a provider of a network, a mobile network standard being utilized (e.g., 3G, 2G, LTE, etc.), and a network coverage (e.g., mobile network coverage). In some embodiments, the initial redundancy level is selected based at least in part on a location identifier. For example, the initial redundancy level is determined based on a mobile network coverage associated with a determined location (e.g., determined using GPS, IP address, signal triangulation, WIFI SSID database, etc.) of a communication sender and/or receiver.

In some embodiments, the initial redundancy level is determined based at least in part on a previously determined redundancy level. For example, a previously determined redundancy level may be associated (e.g., stored in a table database) with a network address identifier (e.g., IP address, subnet, etc.), a network identifier (e.g., SSID), a location identifier, and/or an account identifier of a sender and/or a receiver, and the previously determined redundancy level may be identified and utilized for a communication using the associated identifier.

The initial redundancy level is utilized to send a communication redundantly. In some embodiments, the sending of the communication includes sending data in one or more network packets. The data to be sent is duplicated based on the redundancy level. For example, the redundancy level indicates the number of copies of the data to be sent. In some embodiments, network packets of the data include one or more segments of the data to be sent. For example, audio data to be sent is segmented into audio data frames and the number of audio data segments to be included in a single network packet to be sent is based on the redundancy level. In some embodiments, each different data segment (e.g., audio frame) is sent in different network packets and each network packet includes a plurality of data segments (e.g., audio data frames) based on the redundancy level. For example, each data segment is duplicated a number of times based on the desired redundancy level and each duplicated segment is included in a data packet along with one or more other data segments.

At 304, a request for a new redundancy level is received. In some embodiments, the request includes the request sent in 206 of FIG. 2. In some embodiments, it is determined whether the requested redundancy level should be updated to the requested redundancy level. In some embodiments, determining the whether to update the redundancy level includes analyzing one or more of the following to determine whether updating the redundancy level would be optimal: a bandwidth requirement of the requested redundancy level, a bandwidth capability of a communication channel, a processing requirement of the requested redundancy level, an observed error rate, and a history of one or more previously requested redundancy levels. The requested redundancy level may not be honored. The redundancy level may be modified by a portion of the requested redundancy level or not modified.

At 306, data is provided using an updated redundancy level, if applicable, based at least in part on the received request. The redundancy level may be increased or decreased based on the request. For example, the redundancy level is set to the requested redundancy level. In some embodiments, the redundancy level is modified in part based on the requested redundancy level. For example, the redundancy level is increased or decreased by a portion of the difference between the current redundancy level and the requested redundancy level.

The data to be sent is duplicated based the updated redundancy level. For example, the redundancy level indicates the number of copies of the data to be sent. In some embodiments, each network packet to be sent includes one or more segments of the data to be sent and the number of data segments to be included in a single packet is indicated by the redundancy level. For example, audio data is sent and the audio data is segmented into audio data frames that are duplicated and included in network packets with capacity to include a plurality of audio data frames. In some embodiments, each different data segment (e.g., audio frame) is sent in different network packets and each network packet includes a plurality of data segments (e.g., audio data frames). For example, each data segment is duplicated a number of times based on the updated redundancy level and each duplicated segment is included in a data packet along with one or more other data segments.

Figure 4:
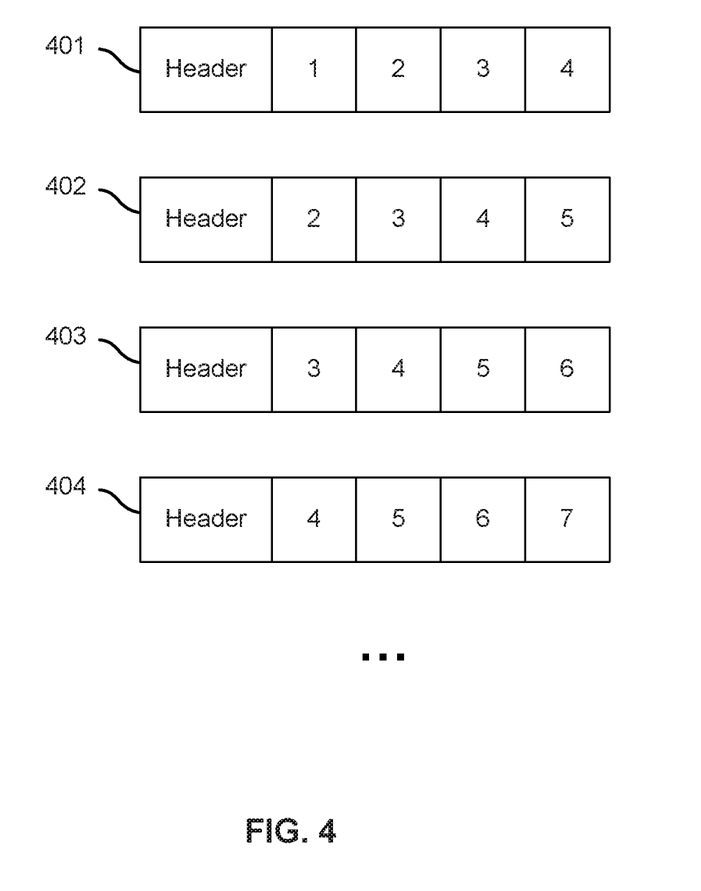
FIG. 4 is a diagram showing an example of data packets sent based on a redundancy level.

FIG. 4 is a diagram showing an example of data packets sent based on a redundancy level. In some embodiments, the data to be sent via a network is divided into sequentially numbered data segments (e.g., audio data frames). A redundancy level of "4" (e.g., four redundancy copies of the data to be sent and four data segments to be sent in each packet) is to be utilized when sending the data. Packet 401 includes header information and four sequentially numbered data segments (i.e., data segments numbers 1 through 4) of the data to be sent. In order to send four data segments in packet 401, the sender may have to delay sending of packet 401 until all four included data segments are ready to be included in the packet. After packet 401 is sent, packet 402 is sent. Packet 402 includes data segments numbered 2 through 5. Data segments 2 through 4 have been previously sent in packet 401 and are being sent in packet 402 as a duplicate based on the redundancy level (e.g., redundancy level requested in 206 of FIG. 2). After packet 402 is sent, packet 403 is sent then packet 404 is sent. The pattern of packets and included data segment numbers will be continued and sent in subsequent packets.

In the example shown, if packet 402 becomes lost, data segments 2 through 5 may be obtained from packet 401 and 403. FIG. 4 shows data segments included in packets in a sequentially increasing order. In some embodiments, data segments may be included in the packets in a sequentially decreasing order. For example, packet 402 may include data segments in the order 5, 4, 3, 2. In some embodiments, rather than delay sending packets, three packets may have been sent prior to packet 401 being sent. For example, a first packet including data segment 1, a second packet including data segments 1 and 2, and a third packet including data segments 1, 2, and 3 may have been sent prior to sending packet 401.

Returning back to FIG. 3, in some embodiments, in order to adjust the redundancy level, encoding bit rate may be modified. For example, when the redundancy level is increased, the bandwidth requirement is increased and in order to conserve bandwidth, encoding of the data to be sent may be modified. In another example, when the redundancy level is decreased, the bandwidth requirement is decreased and in order to increase encoding quality of the data, encoding of the data to be sent may be modified. In some embodiments, modifying the encoding includes modifying an encoding bit rate, fidelity, quality, compression rate, and/or resolution of the data being sent. In some embodiments, an available amount of bandwidth is determined and the available bandwidth is divided by the desired redundancy level to determine the encoding required to fit the available bandwidth. In some embodiments, adjusting the redundancy level includes selecting a different encoding scheme and/or protocol. For example, an encoding scheme more optimal for the new redundancy level may be utilized. In some embodiments, encoding quality of the data may be modified equivalently across all redundant copies of the data to be sent. For example, all redundant copies of the data utilize the same encoding quality and/or scheme. In the example shown in FIG. 4, all the data segments included in the shown packets may utilize the same encoding quality and/or scheme.

In some embodiments, encoding quality of the data may not be modified equivalently across all redundant copies of the data segment to be sent. For example, the redundant copies of the same data segment to be sent may be each encoded in two or more different encoding quality and/or schemes. This may allow a higher fidelity data segment to be utilized, if available, and a lower fidelity data segment to be utilized as a backup. In the example shown in FIG. 4, packet 401 may include a high quality encoding of data segment numbered 1 followed by lower quality encoding of data segments numbered 2 through 4; packet 402 may include a high quality encoding of data segment numbered 2 followed by lower quality encoding of data segments numbered 3 through 5; packet 403 may include a high quality encoding of data segment numbered 3 followed by lower quality encoding of data segments numbered 4 through 6; and packet 404 may include a high quality encoding of data segment numbered 4 followed by lower quality encoding of data segments numbered 5 through 7. Thus if all packets of FIG. 4 are received, the high quality encoding may be utilized for data segments numbered 1 through 4, but if packet 402 is lost, lower fidelity data segment numbered 2 from packet 401 would need to be utilized instead of the higher quality data segment numbered 2 that was included in lost packet 402.

Figure 5:
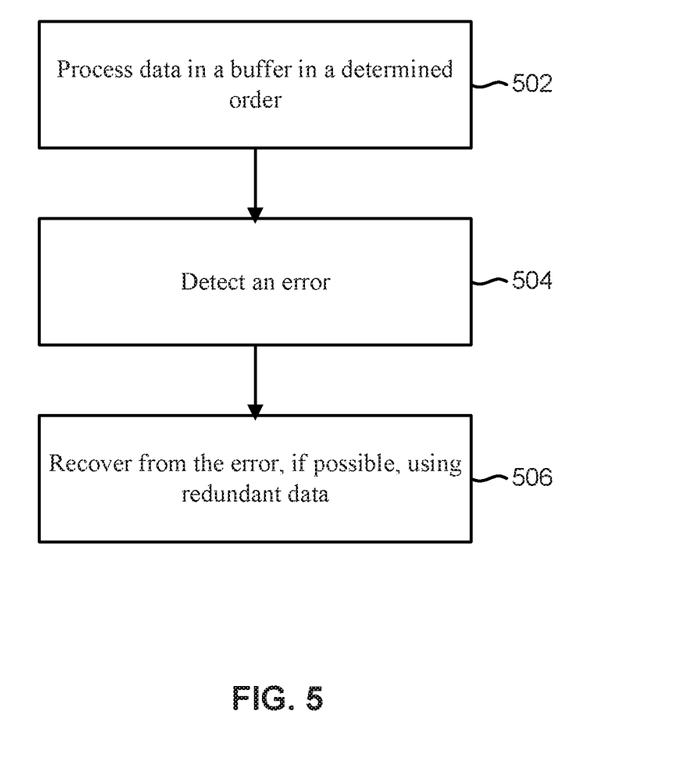
FIG. 5 is a flowchart illustrating an embodiment of a process for handling an error.

FIG. 5 is a flowchart illustrating an embodiment of a process for handling an error. At least a portion of the process of FIG. 5 may be implemented on user device 102, relay server 108, relay server 128, and/or user device 112. For example, the process of FIG. 3 is used by a receiver of data to handle a missing or corrupted packet using a received redundant data.

At 502, data in a buffer is processed in a determined order. In some embodiments, data segments are received from a sender and placed in a buffer at the receiver. For example, data from a live/real-time communication (e.g., network packets of streaming audio data frames) is received and placed in a jitter buffer. In some embodiments, data is received in network packets that include one or more segments of the data. Each network packet may include an order identifier that identifies ordering between network packets. One or more data segments included in the network packet (e.g., as shown in the example of FIG. 4) may be associated with an identifier that identifies ordering between data segments. In some embodiments, as network data packets with one or more data segments are received, the network packets and/or one or more data segments included in the network data packets are placed in the jitter buffer. In some embodiments, changes in redundancy level of a received data may be detected by determining the number of data segments in a received network data packet. For example, the number of data segments in the received network data packet corresponds to the current redundancy level. In some embodiments, changes in redundancy level of a received data may be identified by an identifier included in a header of a received network packet.

In some embodiments, if a redundant data segment that has already been received is received, the redundant data segment may not be placed in the buffer or the previously received data segment may be replaced with the subsequently received redundant data segment. For example, only a signal copy of the same data segment (e.g., all data segments in the jitter buffer have unique sequence identifiers that are greater than an already consumed data segment) that is of the highest received quality/fidelity is stored in the buffer. In some embodiments, received network packets or a data segment(s) included in the network packets are stored in the buffer without prior analysis of whether redundant data is stored in the buffer.

In some embodiments, processing the data includes playing/rendering content of data included in the buffer in a sequence order. For example, the data in the buffer includes live audio communication and audio data frames in a jitter buffer are played/rendered to a user in an identified audio data frame order.

At 504, an error is detected. In some embodiments, detecting the error includes detecting that a network packet has become corrupted and/or is missing. For example, a network packet that is to include a next audio data frame to be played/rendered is determined to be corrupted or missing. In another example, it is determined that data to be stored in a buffer is corrupted or missing.

At 506, the error is recovered, if possible, using redundant data. For example, redundant data provided in 306 of FIG. 3 is used to recover from the error. In some embodiments, recovering from the error includes obtaining desired data (e.g., data segment required to be played/rendered currently in real-time) from a redundantly provided data (e.g., from an alternative network packet that included the desired data segment). The redundant copy of the data may be of a lower quality/fidelity/resolution than the data that has become corrupted/lost due to the error. In some embodiments, the redundant data may not be available and the error cannot be recovered. In some embodiments, obtaining the redundant data includes obtaining the redundant data from the buffer. In some embodiments, obtaining the redundant data includes obtaining the redundant data from a received network data packet that includes the redundant data.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system for analyzing data, comprising:
a processor configured to:
dynamically select an initial redundancy level, wherein real-time communication data to be sent is segmented into real-time communication data frames and the selected initial redundancy level indicates an initial number of copies of a real-time communication data frame of the real-time communication data frames to be sent;
track error events;
classify the error events based on a number of errors included in each event, wherein classifying the error events includes classifying each error event based on a number of network packets affected by the error event;
determine a desired level of error event to be able to be corrected in order to maintain an acceptable rate of uncorrected errors, wherein determining the desired level of error event to be able to be corrected includes analyzing a distribution of the classifications of the number of network packets affected by each error event and selecting a number based on the distribution of the classifications; and
select an updated redundancy level based at least in part on the selected number that is based on the distribution of the classifications, so that new error events corresponding to the desired level of error event or a lower level of error event are corrected, wherein the selected updated redundancy level indicates an updated number of copies of a real-time communication data frame of the real-time communication data frames to be sent; and
a communication interface coupled with the processor and configured to indicate the selected updated redundancy level.

2. The system of claim 1, wherein dynamically selecting the initial redundancy level includes selecting the initial redundancy level based on a network connection parameter.

3. The system of claim 1, wherein dynamically selecting the initial redundancy level includes selecting the initial redundancy level based on a network connection type.

4. The system of claim 1, wherein dynamically selecting the initial redundancy level includes selecting the initial redundancy level based on a type of standard utilized by a network connection.

5. The system of claim 1, wherein dynamically selecting the initial redundancy level includes selecting the initial redundancy level based on a provider of a network connection.

6. The system of claim 1, wherein dynamically selecting the initial redundancy level includes selecting the initial redundancy level based on a signal strength of a network connection.

7. The system of claim 1, wherein dynamically selecting the initial redundancy level includes selecting the initial redundancy level based on a location identifier.

8. The system of claim 1, wherein dynamically selecting the initial redundancy level includes selecting the initial redundancy level based on a previously determined redundancy level.

9. The system of claim 1, wherein dynamically selecting the initial redundancy level includes selecting the initial redundancy level based on a bandwidth of a network connection.

10. The system of claim 1, wherein classifying each error event based on the number of network packets affected by the error event includes classifying each error event based on a number of consecutive network packets affected by the error event.

11. The system of claim 1, wherein the error events are tracked by an end user device communication party of a Voice over Internet Protocol communication.

12. The system of claim 1, wherein the error events are tracked over an interval of time.

13. The system of claim 1, wherein determining the desired level of error event to be able to be corrected includes analyzing the classifications of the error events to determine a lowest threshold classification of error event such that any classifications of error events above the threshold classification include in total a number of errors events below a threshold value.

14. The system of claim 1, wherein determining the desired level of error event to be able to be corrected includes analyzing the classifications of the error events to determine a lowest threshold classification of error event such that any classifications of error events above the threshold classification include in total a percentage of errors events below a threshold percentage.

15. The system of claim 1, wherein two or more of the copies of the real-time communication data frame are encoded in different bit rates.

16. The system of claim 1, wherein the selected updated redundancy level is indicated to a sender of a communication data.

17. The system of claim 16, wherein the selected updated redundancy level is rejected by the sender.

18. The system of claim 1, wherein a transmission encoding rate is modified based on the selected updated redundancy level.

19. A method of analyzing data, comprising:
dynamically selecting an initial redundancy level, wherein real-time communication data to be sent is segmented into real-time communication data frames and the selected initial redundancy level indicates an initial number of copies of a real-time communication data frame of the real-time communication data frames to be sent;
tracking error events;
classifying the error events based on a number of errors included in each event, wherein classifying the error events includes classifying each error event based on a number of network packets affected by the error event;
using a processor to determine a desired level of error event to be able to be corrected in order to maintain an acceptable rate of uncorrected errors, wherein determining the desired level of error event to be able to be corrected includes analyzing a distribution of the classifications of the number of network packets affected by each error event and selecting a number based on the distribution of the classifications; and
selecting an updated redundancy level based at least in part on the selected number that is based on the distribution of the classifications, so that new error events corresponding to the desired level of error event or a lower level of error event are corrected, wherein the selected updated redundancy level indicates an updated number of copies of a real-time communication data frame of the real-time communication data frames to be sent.

20. A computer program product for analyzing data, the computer program product being embodied in a non-transitory computer readable storage medium and comprising computer instructions for:

dynamically selecting an initial redundancy level, wherein real-time communication data to be sent is segmented into real-time communication data frames and the selected initial redundancy level indicates an initial number of copies of a real-time communication data frame of the real-time communication data frames to be sent;

tracking error events;

classifying the error events based on a number of errors included in each event, wherein classifying the error events includes classifying each error event based on a number of network packets affected by the error event;

determining a desired level of error event to be able to be corrected in order to maintain an acceptable rate of uncorrected errors, wherein determining the desired level of error event to be able to be corrected includes analyzing a distribution of the classifications of the number of network packets affected by each error event and selecting a number based on the distribution of the classifications; and selecting an updated redundancy level based at least in part on the selected number that is based on the distribution of the classifications, so that new error events corresponding to the desired level of error event or a lower level of error event are corrected, wherein the selected updated redundancy level indicates an updated number of copies of a real-time communication data frame of the real-time communication data frames to be sent.

* * * * *